March 26, 1968   H. J. JURETSCHKE ET AL   3,375,442
PARAMAGNETIC MICROWAVE POWER DETECTOR WHEREIN INTERACTING
ELECTRIC AND MAGNETIC FIELDS EXIST IN A SINGLE PLANE
Filed Dec. 13, 1962
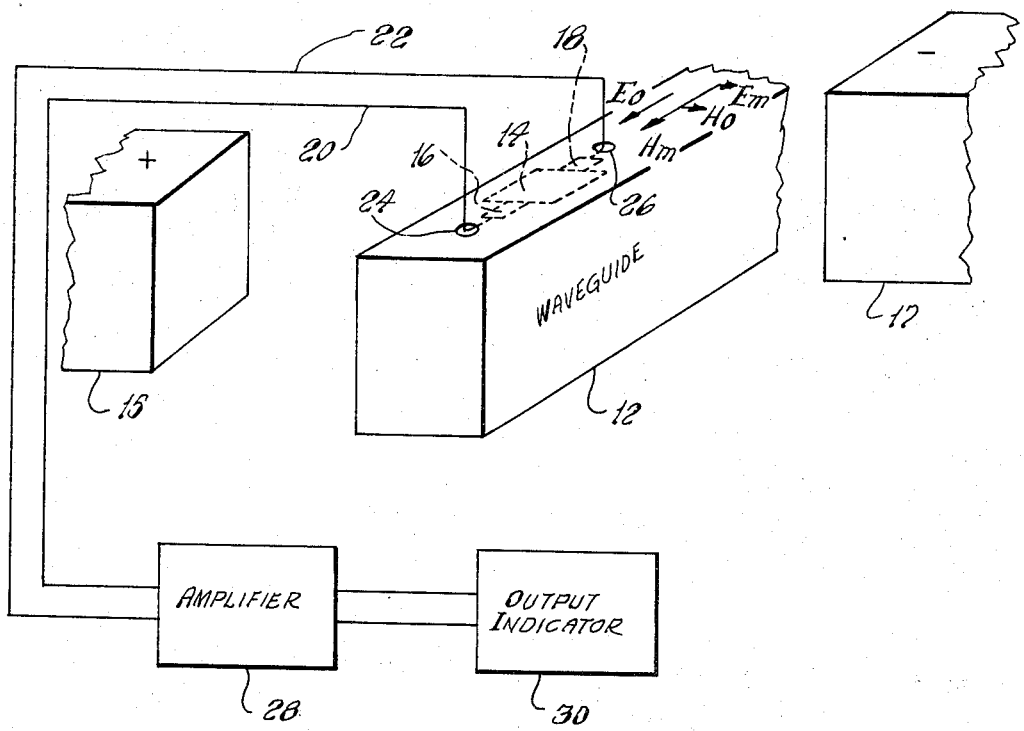
INVENTORS.
HELLMUT J. JURETSCHKE
WALTER G. EGAN
BY
ATTORNEYS 3,375,442
PARAMAGNETIC MICROWAVE POWER DETECTOR WHEREIN INTERACTING ELECTRIC AND MAGNETIC FIELDS EXIST IN A SINGLE PLANE
Hellmut J. Juretschke, Brooklyn, and Walter G. Egan, Richmond Hill, N.Y., assignors, by mesne assignments, to the United States of America as represented by the Secretary of the Navy
Continuation-in-part of application Ser. No. 41,710, July 8, 1960. This application Dec. 13, 1962, Ser. No. 244,534
11 Claims. (Cl. 324—95)

This application is a continuation-in-part of application Ser. No. 41,710, filed July 8, 1960 and now abandoned.

This invention relates to a microwave energy detector and especially to a detector which utilizes the electron spin resonance condition of electrically conductive, strongly paramagnetic materials to detect microwave energy.

The detection and measurement of microwave energy or power is frequently required in fields such as radar and microwave communications. It is therefore desirable to have a device which is capable of detecting and measuring microwave power. The present invention provides a microwave detector which is of simple construction, rugged, and inexpensive, can yield absolute power measurements, can be used at all frequencies, and is linear with respect to microwave power.

Furthermore, the invention can be used to measure frequency and magnetic field strength. It may also be employed for frequency control and power control.

The objects and advantages of the present invention are accomplished by placing a thin film of electrically conductive, strongly paramagnetic material in a region of microwave field where the electric field component is weak and the magnetic field component in the plane of film is strong. A D.C., or time-invariant, magnetic field is set up in the plane of the film at right angles, preferably, to the microwave magnetic field component, the D.C. magnetic field being of such strength as to cause electron spin resonance in the film. A pair of spaced electrodes are connected in the film, preferably along the direction of the microwave magnetic field.

The interaction of the microwave and D.C. magnetic fields generates an electric field in the film in the direction of the electrodes. This electric field has an average, or D.C. component, and produces a D.C. voltage across the electrodes. The D.C. voltage can be amplified and applied to an indicator, such as an output meter, calibrated to provide a reading of the microwave power.

An object of this invention is to measure microwave energy.

Another object is to provide a simple, rugged and inexpensive device for measuring microwave energy.

Yet another object is to provide a device for the measurement of microwave power, the device being linear and usable at all microwave frequencies.

A further object is to provide a device which can be adapted to measure microwave frequency.

Still another object is to provide a device which can be adapted to measure magnetic field strength.

Other objects and many of the attendant advantages of this invention will be readily appreciated as the same becomes better understood by reference to the following detailed description when considered in connection with the accompanying drawings wherein the single figure illustrates an embodiment of the invention.

A waveguide 12, which is partially broken away, is shown in the figure; it is to be understood that the waveguide 12 is coupled to the source of microwave energy which is to be measured. A thin film 14 of electrically conductive, strongly paramagnetic material coated on an insulator material is mounted on an inside wall of the waveguide 12 so that the film 14 faces the interior of the waveguide 12.

The film 14 should be no more than approximately 1000 A., corresponding to the order of the skin depth. The film thickness must be less than the skin depth for the microwave energy which is being detected, since if the film is thicker, the part of the film not penetrated by the microwaves acts as a short on the D.C. electric field induced in the film. (Hereinafter, such a film will be referred to as a "thin film.") The material used for the film 14 is an electrically conductive, strongly paramagnetic material such as the material nickel above its Curie temperature or the electrically conductive material gadolinium, for example. The term "strongly paramagnetic" indicates that an appreciable magnetization is required for the system to operate, for example, that the relative permeability of the material be greater than unity by perhaps 10% or more. The gadolinium, which is ferromagnetic below room temperature and paramagnetic at elevated temperatures, can be employed at a temperature of about 50° C., for example, if it is desired that it be used in its paramagnetic state. The insulating material which supports the film 14 may be a glass plate about 3 mils thick, for example.

A D.C. magnetic field, $H_o$, is set up by means such as an electromagnet (of which only fragmented pole-piece segments 15 and 17 are shown in the figure) so that the field exists in the plane of the film 14. The film 14 is located within the waveguide 12 so that the microwave magnetic field, $H_m$, is also in the plane of the film 14 at right angles to the D.C. magnetic field. The microwave electric field, $E_m$, is then in the same direction as the D.C. magnetic field, $H_o$. This is indicated by arrows in the figure. The location of the film 14 should also be at a point at which the microwave electric field, $E_m$ is weak and the magnetic microwave field, $H_m$, is strong. For example, the film 14 may be placed one quarter wavelength from the short terminating a rectangular waveguide propagating in the $TE_{10}$ mode.

A pair of electrodes 16 and 18 are affixed to the film 14 in the direction of polarization, if it exists, and output leads 20 and 22 are soldered to the electrodes 16 and 18 with low thermal solder. The leads 20 and 22 are brought out of the waveguide 12 through small holes 24 and 26 and fed to an amplifier 28, whose output, in turn, is applied to an output indicator 30.

If the device is being employed to measure microwave power, the energy to be measured is propagated through the waveguide 12 to the film 14. The strength of the D.C. magnetic field, $H_o$, is varied until a maximum output signal is obtained. This occurs in the neighborhood of the magnetic spin resonance peak. A D.C. electric field, $E_o$, is set up in the plane of the film 14 and produces a D.C. voltage across the electrodes 16 and 18 which is directly proportional to the incident microwave power. It is believed that the D.C. electric signal produced is a result of a Hall effect interaction between the microwave components of the magnetization and the eddy currents in the film, and a magneto-resistance effect due to variation in resistance of the film resulting from the variation in magnetization of the film as the microwave field varies. The variation in resistance of the film affects the strength of the signal induced in the film by the D.C. magnetic field, $H_o$. These interactions provide an average, or steady-state, electric field. If the microwave energy is continuous, the D.C. output signal is constant; if the microwave energy is pulsed, the D.C. output signal is correspondingly pulsed.

The D.C. output voltage is applied to an amplifier 28, which is a D.C. amplifier if the D.C. output signal is steady and an A.C. amplifier if the D.C. output signal is pulsed. The output of the amplifier 28 is then fed to an output indicator 30 which may be a voltmeter or oscilloscope calibrated to read in terms of power. Calibration may be accomplished by the use of various microwave signals of known power, the frequency of the microwave signals and the D.C. magnetic field strength ($H_o$) being maintained constant.

If it is desired to employ the device to measure magnetic field strengths, the output indicator is calibrated in terms of magnetic field strength by the use of magnetic fields ($H_o$) of known strength and a microwave signal in the waveguide 12 of fixed frequency and power.

Similarly, the device can be used as a frequency meter by calibrating the output indicator in terms of frequency, an adjustable magnetic field strength ($H_o$) and fixed level microwave power being employed while the microwave frequency is set at known values.

It should be apparent that the use of a waveguide is for the purpose of conveniently propagating the microwave energy. If the microwave energy is propagated in another manner, e.g., through the air by means of a microwave "dish" antenna, the thin film must be suitably located therein in accordance with the magnetic and electric field orientations, as described heretofore.

Obviously many modifications and variations of the present invention are possible in the light of the above teachings. It is therefore to be understood that within the scope of the appended claims the invention may be practiced otherwise than as specifically described.

We claim:

1. A device for the detection of microwave electromagnetic energy comprising, in combination:
    a thin film of electrically conductive, strongly paramagnetic material located within the electromagnetic field of said microwave energy at a point where the magnetic component of the microwave field is strong and lies in the plane of said film, the electric component of the microwave field also lying in the plane of said film;
    means for establishing a time-invariant magnetic field in the plane of said film at right angles to the microwave magnetic field, the strength of said time-invariant magnetic field being sufficient to produce a condition of magnetic spin resonance in said film; and
    a pair of spaced electrodes in electrical contact with said film, the direction of the spacing being the same as the direction of the D.C. electric field produced in said film by the interaction of the microwave energy with the time-invariant magnetic field.

2. A device as set forth in claim 1, further including means connected to said electrodes for indicating the existence of a D.C. voltage between said electrodes.

3. A device for the detection of microwave electromagnetic energy comprising, in combination:
    a thin film of electrically conductive, strongly paramagnetic material located within the electro-magnetic field of said microwave energy at a point where the magnetic component of the microwave field is strong and lies in the plane of said film, the electric component of the microwave field also lying in the plane of the film;
    means for establishing a time-invariant magnetic field of adjustable strength in the plane of said film at right angles to the microwave magnetic field so that the strength of said time-invariant field can be adjusted to produce a condition of magnetic spin resonance in said film; and
    a pair of spaced electrodes in electrical contact with said film, the direction of the spacing being the same as the direction of the interaction of the microwave energy with the time-invariant magnetic field.

4. A device as set forth in claim 3 further including means connected to said electrodes for indicating the existence of a D.C. voltage between said electrodes.

5. A device for the detection of microwave electromagnetic energy comprising, in combination:
    a waveguide for propagating said microwave energy;
    a thin film of electrically conductive, strongly paramagnetic material located within said waveguide at a point where the magnetic component of the microwave field is strong and lies in the plane of said film, the electric component of the microwave field also lying in the plane of said film;
    means for establishing a time-invariant magnetic field in the plane of said film at right angles to the microwave magnetic field, the strength of said time-invariant magnetic field being sufficient to produce a condition of magnetic spin resonance in said film;
    a pair of spaced electrodes in electrical contact with said film, the direction of the spacing being the same as the direction of the D.C. electric field produced in said film by the interaction of the microwave energy with the time-invariant field; and
    means connected to said electrodes for indicating the existence of a D.C. voltage between said electrodes.

6. A device as set forth in claim 5, further including means to vary the strength of said time-invariant magnetic field.

7. A device for the measurement of microwave electromagnetic energly comprising, in combination:
    a thin film of electrically conductive, strongly paramagnetic material located within the electromagnetic field of said microwave energy at a point where the magnetic component of the microwave field is strong and lies in the plane of said film, the electric component of the microwave field also lying in the plane of the film;
    means for establishing a time-invariant magnetic field in the plane of said film at right angles to the microwave magnetic field, the strength of said time-invariant magnetic field being sufficient to produce a condition of magnetic spin resonance in said film;
    a pair of spaced electrodes in electrical contact with said film, the direction of the spacing being the same as the direction of the D.C. electric field produced in said film by the interaction of the microwave energy with the time-invariant magnetic field;
    an amplifier having an output and an input, the latter being connected to said pair of electrodes;
    and an output indicator connected to the output of said amplifier.

8. A device for the measurement of microwave electromagnetic energy comprising, in combination:
    a thin film of electrically conductive, strongly paramagnetic material located within the electromagnetic field of said microwave energy at a point where the magnetic component of the microwave field is strong and lies in the plane of said film, the electric component of the microwave field also lying in the plane of the film;
    means for establishing a time-invariant magnetic field of adjustable strength on the plane of said film at right angles to the microwave magnetic field, the strength of said time-invariant magnetic field being sufficient to produce a condition of magnetic spin resonance in said film;
    a pair of spaced electrodes in electrical contact with said film, the direction of the spacing being the same as the direction of the D.C. electric field produced in said film by the interaction of the microwave energy with the time-invariant magnetic field;
    an amplifier having an output and an input, the latter being connected to said pair of electrodes;
    and an output indicator connected to the output of said amplifier.

9. A method for the detection of microwave energy comprising the steps of:
placing a thin film of electrically conductive, strongly paramagnetic material, having a pair of spaced electrodes in electrical contact therewith, in a field of electromagnetic microwave energy, orienting said film so that the magnetic and electric components of the microwave field lie in the plane of said film;
establishing a time-invariant magnetic field in the plane of said film transverse to the direction of the magnetic component of said microwave field;
adjusting the strength of said time-invariant magnetic field until a state of electron spin resonance is attained in said film; and
placing spaced electrodes in electrical contact with said thin film, the direction of spacing being the same as the direction of the D.C. electric field produced in said film by the interaction of the microwave energy with the time-invariant magnetic field.

10. A method for the detection of microwave energy comprising the steps of:
placing a thin film of electrically conductive, strongly paramagnetic material, having a pair of spaced electrodes in electrical contact therewith, in a field of electromagnetic microwave energy at a point where the microwave magnetic component is strong and lies in the plane of the film, the electric component of the microwave field also lying in the plane of the film;
establishing a time-invariant magnetic field in the plane of said film transverse to the direction of the magnetic component of said microwave field;
adjusting the strength of said time-invariant magnetic field until a state of electron spin resonance is attained in said film; and
placing spaced electrodes in electrical contact with said thin film, the direction of spacing being the same as the direction of the D.C. electric field produced in said film by the interaction of the microwave energy with the time-invariant magnetic field.

11. A method for the detection of microwave energy comprising the steps of:
placing a thin film of electrically conductive, strongly paramagnetic material, having a pair of spaced electrodes in electrical contact therewith, in a field of electromagnetic microwave energy at a point where the microwave magnetic component is strong and lies in the plane of the film, the electric component of the microwave field also lying in the plane of the film;
establishing a time-invariant magnetic field in the plane of said film transverse to the direction of the magnetic component of said microwave field.
adjusting the strength of said time-invariant magnetic field until a maximum D.C. electric field is produced in said film between said spaced electrodes; and
placing spaced electrodes in electrical contact with said thin film, the direction of spacing being the same as the direction of the D.C. electric field produced in said film by the interaction of the microwave energy with the time-invariant magnetic field.

References Cited

UNITED STATES PATENTS

| | | | |
|---|---|---|---|
| 2,793,360 | 5/1957 | Beaumont | 340—347 |
| 2,894,209 | 7/1959 | Chodorow et al. | 331—94 |

OTHER REFERENCES

Egan, W. and Juretschke, H. J., "Detection of Ferromagnetic Resonance," Bull. Am. Phy. Soc., Ser. II, 3, 1958, page 194.

Sensiper, Samuel, Resonance Loss Properties of Ferrites in the 9Kmn Region, in Proceedings of the IRE, vol. 44, No. 10, October 1956, pp. 1323–1342.

RUDOLPH V. ROLINEC, *Primary Examiner.*

WALTER L. CARLSON, *Examiner.*

G. L. LETT, E. F. KARLSEN, *Assistant Examiners.*